United States Patent
Brielmaier et al.

(10) Patent No.: US 9,843,245 B2
(45) Date of Patent: Dec. 12, 2017

(54) APPARATUS AND METHOD FOR WINDING AN ELECTRIC-MOTOR LAMINATED CORE WITH A MAGNET COIL

(71) Applicant: Robert Bosch GmbH, Stuttgart (DE)

(72) Inventors: Wolfgang Brielmaier, Neuhausen (DE); Rainer Silberer, Rutesheim (DE); Gyoergy Mucsi, Ditzingen (DE); Juergen Hagedorn, Lübbecke (DE); Edmar Lopes, Stuttgart (DE); Heiko Wurster, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 348 days.

(21) Appl. No.: 14/383,125

(22) PCT Filed: Jan. 24, 2013

(86) PCT No.: PCT/EP2013/051288
§ 371 (c)(1),
(2) Date: Sep. 5, 2014

(87) PCT Pub. No.: WO2013/131679
PCT Pub. Date: Sep. 12, 2013

(65) Prior Publication Data
US 2015/0020376 A1    Jan. 22, 2015

(30) Foreign Application Priority Data

Mar. 5, 2012   (DE) .......................... 10 2012 203 377

(51) Int. Cl.
*H02K 15/00*    (2006.01)
*H02K 15/04*    (2006.01)
(Continued)

(52) U.S. Cl.
CPC ....... *H02K 15/0435* (2013.01); *H02K 15/095* (2013.01); *H02K 3/325* (2013.01); *Y10T 29/49009* (2015.01); *Y10T 29/53143* (2015.01)

(58) Field of Classification Search
CPC .. H02K 15/0435; H02K 15/095; H02K 3/325; Y10T 29/53143; Y10T 29/49009
(Continued)

(56) References Cited

U.S. PATENT DOCUMENTS

| | | | | |
|---|---|---|---|---|
| 3,710,437 A | * | 1/1973 | Kipple et al. | H02K 15/12 264/272.2 |
| 6,357,689 B1 | * | 3/2002 | Dolgas et al. | H02K 15/095 242/432.6 |
| 6,702,222 B2 | * | 3/2004 | Meier | H02K 15/095 242/432.6 |

FOREIGN PATENT DOCUMENTS

WO       99/66622 A2    12/1999

OTHER PUBLICATIONS

International Search Report corresponding to PCT Application No. PCT/EP2013/051288, dated Jul. 4, 2014 (German and English language document) (5 pages).

\* cited by examiner

*Primary Examiner* — Peter DungBa Vo
*Assistant Examiner* — Azm Parvez
(74) *Attorney, Agent, or Firm* — Maginot, Moore & Beck LLP

(57) ABSTRACT

An apparatus is provided for winding a laminated core with a magnet coil for an electric motor in which a conductive, insulated coil wire is wound into one or multiple pole tip grooves of a winding surface of the laminated core. The apparatus comprises a holding device, a counter holding device, and one or multiple clamping elements. The holding device is configured to fix the laminated core to be wound (Continued)

during a winding process. The one or multiple clamping elements are configured to fix an insulating paper to one of the one or multiple pole tip grooves.

20 Claims, 6 Drawing Sheets

(51) Int. Cl.
*H02K 15/095* (2006.01)
*H02K 3/32* (2006.01)

(58) Field of Classification Search
USPC .................. 29/596, 592.1, 732, 729, 700
See application file for complete search history.

APPARATUS AND METHOD FOR WINDING AN ELECTRIC-MOTOR LAMINATED CORE WITH A MAGNET COIL

This application is a 35 U.S.C. §371 National Stage Application of PCT/EP2013/051288, filed on Jan. 24, 2013, which claims the benefit of priority to Serial No. DE 10 2012 203 377.7, filed on Mar. 5, 2012 in Germany, the disclosures of which are incorporated herein by reference in their entirety.

BACKGROUND

The disclosure relates to an apparatus and a method for winding a laminated core with a magnet coil for an electric motor and in said apparatus a conductive, insulated coil wire can be wound into one or multiple grooves, in particular pole tip grooves, of a winding surface of the laminated core, said apparatus comprising a holding device for the purpose of fixing the laminated core that is to be wound during the winding process and a counter holding device. Furthermore, the disclosure relates to an electric motor and an electric tool machine in which an electric motor is installed, and in said electric motor a laminated core was wound by means of a device in accordance with the disclosure.

Previous electric motors have been installed primarily in electric tool machines, such as angle grinders, drills, drill hammers, by way of example series, shunt-wound or compound motors whose stators are divided, and that can be fitted together. For this purpose, the laminated core of the stator that directs the magnetic field lines and is used as a support of the stator coil is constructed in a two part or multipart manner. As a consequence, it is possible for each laminated core part to be wound with a magnet coil and, as the individual laminated cores are fitted together, a semicylindrical stator is formed and magnet coils are wound onto so-called pole tips in the inner diameter of said semicylindrical stator.

A pin winding method or a flyer winding method is typically used for the purpose of attaching the magnet coils to the laminated core of the stator or also to the armature. In the case of the pin winding method, a closed stator or an armature core is wound with the aid of one or two winding pins. In the case of the flyer winding method, initially a coil is wound onto a correspondingly embodied winding form with the aid of a flyer, wherein either the flyer arm rotates around the (stationary) laminated core or the laminated core rotates with respect to a stationary flyer arm. After the winding process, the coil is mechanically formed and, with the aid of a tool, is inserted into the provided groove slots. Stators of this type are generally embodied in two or multiple parts in order to improve accessibility. After the winding process, the wire ends are provided with heat shrink sleeves and are assembled with crimp contacts.

For a mass production process, it is known to initially assemble the magnet coils and to insert the entire magnet coil into the pole tips of a laminated core. For this purpose, the insulated coil wire is initially wound onto a "magnet coil holding device", the coil is provided with a defined measurement in advance and is subsequently inserted or rather press-fitted into pole tip grooves of the stator.

SUMMARY

The disclosure is based on an apparatus for winding a laminated core with a magnet coil for an electric motor, in particular for the purpose of fixing a laminated core that is to be wound with a magnet coil and in said apparatus a conductive, insulated coil wire can be wound into one or multiple grooves, in particular pole tip grooves, of a winding surface of the laminated core. The apparatus comprises a holding device for the purpose of fixing the laminated core that is to be wound during the winding process and said apparatus also comprises a counter holding device.

It is proposed that one or multiple clamping elements are provided for the purpose of fixing an insulating paper to a pole tip groove.

The magnet coil can be advantageously wound directly and with an optimal shaping process in a laminated core of a stator or an armature so that additional mechanical changes and/or damage to the insulating paper and the magnet coil can be avoided during the assembly process and the quality of the magnet coil and also of the electric motor can be optimized. In particular, the apparatus is particularly suitable for directly winding stators or rather stator halves in which individual wires stand higher than the pole tip.

A process of directly winding the laminated core can be implemented using the winding apparatus, wherein the laminated core is fixed or inserted into a holding device, and by means of a counter holding device, which essentially comprises a form-complementing winding support surface and which can be displaced or pivoted with respect to the region of the winding surface of the laminated core, said region protruding out of the pole tip groove, in such a manner that a winding gap can be embodied into which a coil wire can be wound so that a process of directly winding the coil wire into the pole tip grooves of the laminated core can be implemented for the purpose of forming a magnet coil. Prior to this, by way of example, insulating paper that is used for the purpose of providing electrical insulation between the laminated core and coil wire in the pole tip groove can be inserted into the pole tip grooves of the laminated core that is to be wound, after which the apparatus can be brought into an operating position by means of displacing or pivoting the counter holding device with respect to the holding device for the purpose of forming the winding gap and said apparatus can fix the insulating paper. One or multiple clamping elements can be used in accordance with the disclosure for the purpose of fixing the insulating paper to the pole tip groove and said clamping elements securely clamp the insulating paper in such a manner that said paper can no longer move and also can no longer be damaged during the subsequent winding process. In this manner, it is possible to achieve a permanent insulation between magnet coils and stator laminated core in accordance with the production process.

The insulating paper can be advantageously further securely clamped during the winding process after inserting the laminated core into the holding device by means of closing the first clamping elements for the purpose of fixing the insulating paper to the holding device in order to achieve a secure abutment for the purpose of fixing the insulating paper. In particular, it is possible to provide said first clamping elements on the face that is remote from the pole tip, therefore rendering it possible to achieve a particularly simple and easily automated movement curve of the clamping elements. It is preferred that the clamping elements can be embodied as clamping claws in order to render possible a secure and reliable fixing. In a further optimized embodiment, the insulating paper can then be fixed by means of one or multiple second clamping elements during the process of bringing the entire winding apparatus together and said second clamping elements are attached to the counter holding device and can preferably be embodied as sliding clamps. It is especially preferred that said second clamping elements can be attached to the face that faces the pole tip of the laminated core in order on the one hand to be able to fix the insulating paper whilst bringing together the holding device and counter holding device as early as possible in a particularly cost-effective manner, and on the other hand to render possible a simple movement curve of the second clamping elements in order to automate the winding process. For this purpose, the coil shaping element can comprise a groove in a cost-effective manner for the purpose of guiding this second clamping element, wherein the clamping element can be pulled back whilst bringing the winding apparatus together in order to securely fix the insulating paper in this manner between the winding support surface and the one or multiple second clamping elements on the face of the pole tip groove that faces the pole tip of the laminated core. With this arrangement of clamping elements, the insulating paper can be securely fixed during the entire winding process without the necessity of providing additional grooves for the purpose of fixing the insulating paper in the apparatus. A particular advantage of this embodiment in accordance with the disclosure is that the entire process of inserting the laminated core into the winding apparatus and implementing the winding process can be entirely automated and it is not necessary to manually insert and fix the insulating paper in potential grooves. As a consequence, it is possible to improve the quality of the parts in the case of the automated production process.

The described apparatus thus to a large extent avoids damage to the insulating paper which can lead to a failure or a short circuit of the electric motor if further damage to the insulating layer of the coil wire also occurs as a result of sharp edges of the laminated core. It is therefore possible to optimize the quality and serviceable life of the electric motor.

It is possible by means of a so-called flyer winding technique or a comparable winding technique to subsequently wind a wire into the winding gap for the purpose of forming a magnet coil. A process of influencing the form of the coil cross section is rendered possible as a result of the one or multiple coil shaping elements that are arranged on the winding support surface, by way of example edges, lugs, cut-outs in the region of the longitudinal edges and front ends of pole tips during the process of winding in the coil wire at such critical positions where the magnet coil protrudes out of the pole tip grooves and said process of influencing the form of the coil ensures an optimal adjustment of the magnet coil to the laminated core and to an optimized magnetic field coil cross section. As a result of the direct winding process, it is not necessary to remove, press-fit and mold the magnet coil, wherein the characteristic stability of the magnet coil increases and the production cycle can be shortened. As a result of the direct winding process, it is possible to avoid damage to the insulating paper or to the coil wire insulation. As a consequence, it is possible to achieve optimally formed magnet coils and as a consequence, in the case of identical construction sizes, to provide magnetically optimized stators and electric tool machines that are more electrically efficient.

Corresponding to an advantageous embodiment of the disclosure, a guiding element can be provided on the holding device so that the one or multiple first clamping elements of the holding device can be moved perpendicular to the surface of the insulating paper during the process of closing the one or multiple first clamping elements for the purpose of fixing the insulating paper to the pole tip groove face that is facing the pole tip of the laminated core. As a consequence, it is possible to ensure that the insulating paper can be optimally fixed without the possibility of the insulating paper being displaced or even damaged as a result of the effect of lateral forces during potential tilting whilst attaching the first clamping elements that are embodied by way of example as clamping claws. This can essentially contribute to a production process of electric motors that is suitably optimized in terms of quality.

The insulating paper can be fixed in an advantageous manner to the pole tip groove face that is facing the pole tip of the laminated core by way of closing the gap between the winding support surface and the one or multiple second clamping elements by means of pulling back the one or multiple second clamping elements in the direction that is remote from the laminated core. In this manner, the insulating paper can be pushed into the gap whilst it is open without the need for a large application of force and said process can be performed in an automated manner. If the insulating paper then lies in the correct position, the gap can then be gradually closed by means of pulling back the second clamping elements that are by way of example embodied as slider clamps and the paper can be slowly and securely clamped without the danger of the insulating paper slipping or becoming damaged. After the final closing process of the gap, the insulating paper is fixed in this manner with a correspondingly large force and can no longer move during the entire winding process.

In a cost-effective embodiment of the disclosure, said process of pulling back the one or multiple second clamping element can be provided for the purpose of fixing the insulating paper by means of bringing together the holding device and the counter holding device. This coordination of the movements of holding and counter holding devices and also of the clamping elements renders it possible to achieve the object of an automated production process of the entire winding process of the laminated core as quickly and as cost-effectively as possible.

In a further advantageous embodiment of the disclosure, the apparatus can comprise a heating device for the purpose of baking the magnet coil and/or laminated core. A baking process can thus be used in a cost-effective manner for the purpose of fixing the magnet coil after the winding process. Typically, the winding process is performed for this purpose with coil wire that is already pre-coated so that a baking process can be expediently performed by way of a corresponding heating process. It is therefore particularly advantageous to provide a heating device in combination with the winding apparatus so that the entire baking process can be performed in situ and it is not necessary to transport the wound laminated core into a different device for the purpose of baking, the transportation process itself being encumbered with the danger of the laminated cores and/or magnet coils becoming deformed or damaged.

In an additional aspect, the disclosure proposes a method for winding a laminated core with a magnet coil, and in said method a conductive, insulated coil wire is wound into one or multiple grooves, in particular pole tip grooves of a winding surface of the laminated core. During the winding process, at least one coil shaping element of the winding support surface can influence the winding position of the coil wire or rather the form of a part region of the coil that protrudes out of the groove. As a consequence, the direct winding of a laminated core of a stator or armature is proposed, wherein one or multiple coil shaping elements on a winding support surface of a counter holding device influence the winding position of the coil wire so that a magnetically and mechanically optimized coil form can be achieved. The method is further characterized by virtue of the fact that a laminated core that is provided with an insulating paper is inserted in the apparatus, wherein the insulating paper is fixed by means of one or multiple clamping elements to a pole tip groove. In this manner, a very secure fixing can be advantageously achieved during the entire winding process and at the same time a production process that is to a large extent automated having optimal production cycles can be rendered possible. Possible damage to the insulating paper prior to the process of mounting on a stator and assembling in an electric motor is also avoided to a large extent.

In a particularly cost-effective embodiment of the method, the insulating paper can be fixed by way of one or multiple first clamping elements on the holding device and/or can be further fixed by way of one or multiple second clamping elements on the counter holding device. It is possible in this manner to support a particularly reliable embodiment of an automated winding process, said embodiment being at the same time optimized as far as machine technology is concerned, and at the same time to avoid any possible damage to the insulating paper that has been inserted, and as a consequence to prevent a magnet coil prematurely failing.

In accordance with an advantageous further development of the method, after concluding the winding process, a baking process can be performed, in particular a complete baking process. After opening the winding apparatus, there is the danger of the wire falling out of the laminated core since there is no longer any tension. As a result of a baking process, in particular a complete baking process, the coil can be fixed to the pole shoe so that a displacement of the individual coil wires or the winding position can be prevented. In this case, the object is to keep the extent of the baking as large as possible, in particular to complete the baking process, so that further heating of the laminated core is no longer necessary. For this purpose, the winding apparatus can comprise a heating device for the purpose of heating the laminated core so that at least one partial baking process of the coil can be achieved. The baking process can even be performed during the winding process. One production concept thus provides that the coil is only partially baked in order to ensure the fixing process for further processing steps. An alternative concept provides that the holding device is completely removed from the winding apparatus and the complete baking process is performed in the holding device. Furthermore, the coil can be entirely coated in the subsequent process. As a consequence, the costly baking tools can be omitted and also the amount of space required on the production line is reduced. Furthermore, the complete pre-coating provides the advantages of an improved insulation. The process of baking the coil in the winding apparatus is in particular advantageous for the reason that since during the process of opening the apparatus, in other words removing the holding device and the counter holding device, there is a lack of pretension and as a consequence the coil would come undone. Since the pole shoe geometry in the case of motors for electric tools or other highly compact motors does not provide any fixing of the coils, the baking process within the apparatus is advantageous for the purpose of increasing the quality and the production rates and for reducing costs.

It is proven to be particularly advantageous that the winding apparatus in accordance with the disclosure can be used with a single process of heating the magnet coil with a laminated core for the purpose of baking the magnet coil in one work cycle that is performed directly afterwards for the purpose of powder coating the parts. The process of heating the magnet coil can be performed by way of example by means of feeding a current through the magnet coil.

The coil that is heated in a first process step can be removed from the apparatus and can be immersed for example in a powder immersion bath for a second process step. A single process of heating the magnet coil therefore renders possible a production process that requires less investment, smaller amounts of energy consumption and less installation space. The single process of heating furthermore renders possible linear concepts for the production process that can achieve competitive production cycles.

In an additional aspect, the disclosure proposes an electric motor, in particular a series motor, shunt-wound motor or compound-alternating current motor that comprises a stator and/or an armature that is assembled from at least one laminated core, in particular two or multiple laminated cores. The laminated cores are wound in accordance with the above-mentioned winding method with in each case a magnet coil, and the electric motor is designed to be used in an electric tool, preferably in a hand-operated electric tool machine, such as an angle grinder, drill or drill hammer. Electrically efficient electric motors can be proposed as a result of an improved construction of the wound magnet coil and said electric motors deliver the identical electrical power with smaller construction sizes and, as a consequence, in particular in the case of hand-operated electric tools, can lead to a reduction in size, a saving on weight and compact constructions.

Accordingly, in a further novel aspect, an electric tool machine is proposed that comprises an above-described motor.

BRIEF DESCRIPTION OF THE DRAWINGS

Further advantages are evident in the following description of the drawing. Exemplary embodiments of the disclosure are illustrated in the drawings. The drawings, the description and the claims include numerous features in combination. The person skilled in the art will also expediently consider the features individually and combine them to form further expedient combinations.

The drawings illustrate in an exemplary manner:

In the drawings:

FIG. 1 shows a schematic view of a laminated core with magnet coil in accordance with a first exemplary embodiment of the disclosure;

FIG. 2 shows a perspective view of an advantageous winding apparatus for the purpose of applying a magnet coil to a laminated core;

FIG. 3 shows a schematic view of the alignment of a holding and a counter holding device of a winding apparatus in accordance with the disclosure;

FIG. 4 shows a perspective view of a holding device with an inserted laminated core in accordance with an exemplary embodiment of the disclosure;

FIG. 5 shows a perspective view of a counter holding device with an opened second clamping element in accordance with an exemplary embodiment of the disclosure; and FIG. 6 shows a perspective view of a counter holding device with an applied laminated core in accordance with an exemplary embodiment of the disclosure.

DETAILED DESCRIPTION

In the figures, identical components or components of an identical type are all assigned the same numeral. The figures illustrate only examples and are not to be understood as limiting.

Figure 1A:
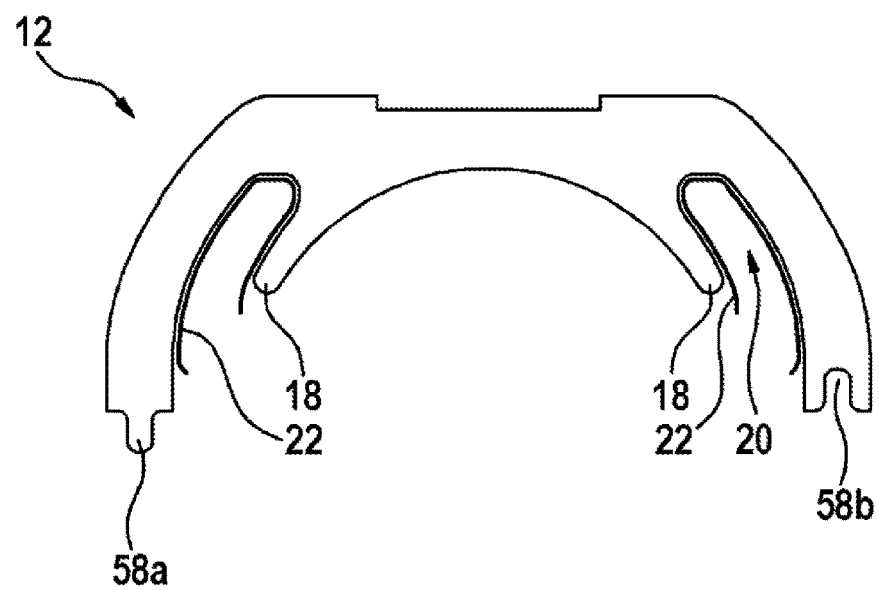
Figure 1B:
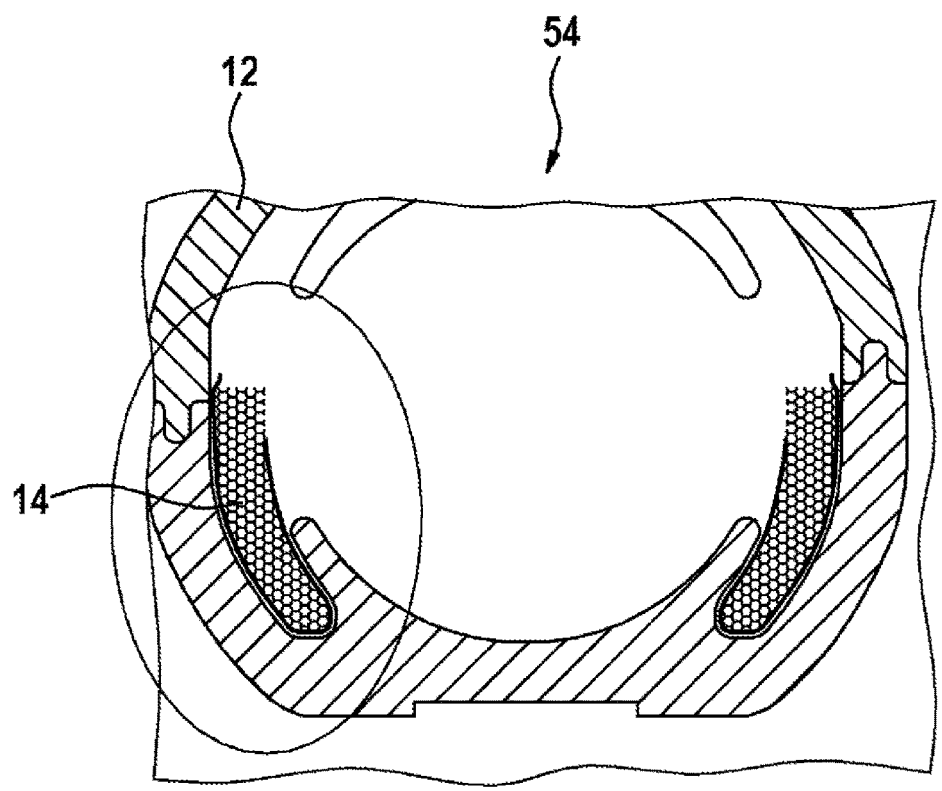

FIGS. 1a and 1b illustrate the construction of a stator from two laminated cores 12 that can be connected to one another in a positive-locking manner by way of connecting elements 58a, 58b in the form of a tongue and groove connection. The two stator half shells 54 comprise a laminated iron sheet and comprise pole tips 18 on the inner face of the stator surface and said pole tips form a pole tip groove 20 with the inner surface of the laminated core 12 and coil wires of a magnet coil 14 can be inserted into said pole tip groove. The inner face of the pole tip groove 20 together with an inner surface of the laminated core 12 that protrudes beyond said pole tip groove defines a winding surface 22 on which the magnet coil 14 that is to be wound is supported with respect to the laminated core 12. FIG. 1a illustrates the cross section through a laminated core 12 of a stator half shell 54 of a stator in accordance with a first exemplary embodiment of the disclosure. FIG. 1b illustrates a cross section through a stator half shell 54 that comprises a laminated core 12 in which pole tip grooves 20 are defined by means of a pole tip 18, wherein a coil wire 16 is wound into the pole tip groove 20 for the purpose of forming a magnet coil 14, produced by means of an embodiment of an apparatus in accordance with the disclosure.

Figure 2:
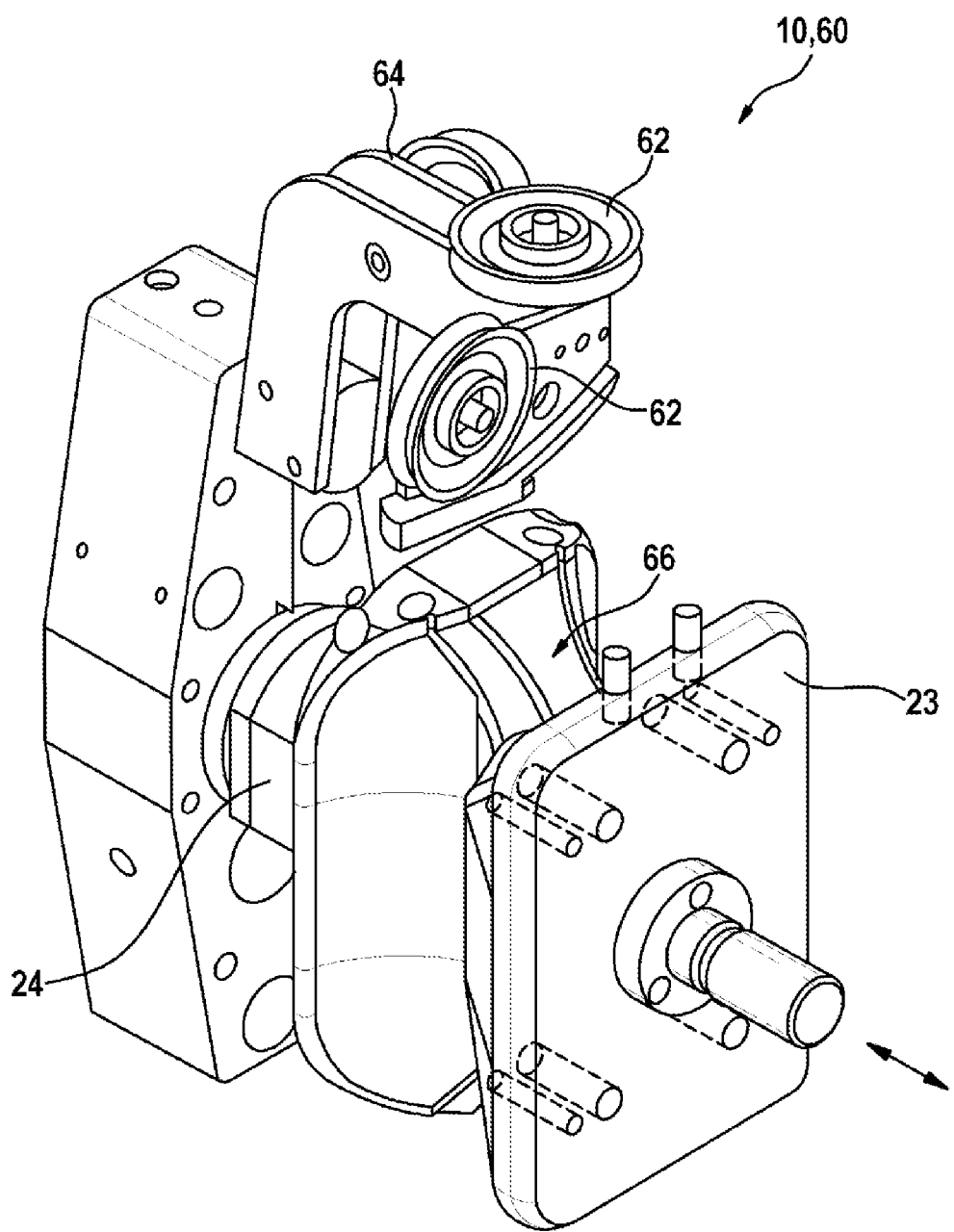

FIG. 2 illustrates a perspective three-dimensional view of a winding apparatus 10 as a flyer winding apparatus 60. The flyer winding apparatus 60 comprises a holding device 23 on which a laminated core 12, by way of example a stator half shell, can be arranged. Furthermore, a counter holding device 24 is provided that comprises a winding support surface 26 that is formed in a manner that essentially complements the form of the inner surface of the laminated core 12 of the stator half shell 54. The winding support surface comprises coil shaping elements in the form of shaping grooves that render possible a defined distribution of the winding position of a coil wire during the winding process. This coil wire is fed by way of wire guiding means 62 that can be wound in position and at a winding speed by means of a flyer winding arm 64 around grooves of the laminated core. For this purpose, the system of a holding and counter holding device 23, 24 can be rotated relative to one another in order to render possible a process of winding the wire onto the laminated core 12. Alternatively, the flyer winding arm 64 can be rotated with respect to the stationary laminated core 12.

Figure 3:
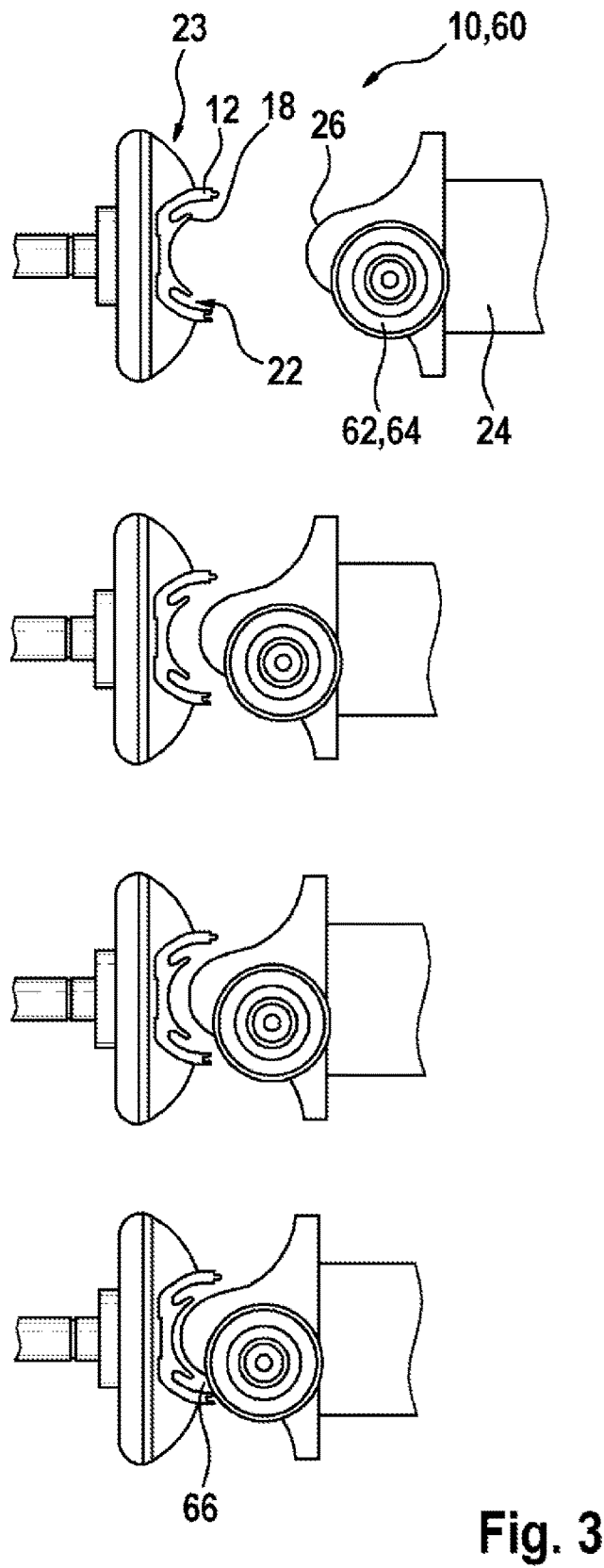

FIG. 3 illustrates a process of spatially bringing together a holding device 23 of a flyer winding apparatus 60 and a counter holding device 24, whereby the region of the winding surface 22 of a laminated core 12 that protrudes out of the pole groove can be displaced towards a winding support surface 26 of a counter holding device 24. The laminated core 12 is inserted into the holding device 23 prior to bringing the two devices together, wherein first clamping elements 70 are brought together and as a result can securely clamp the insulating paper 50 that is already inserted into the laminated core 12 to the face of the pole tip groove 20 that is remote from the pole tip 18. A process of pulling back the one or multiple second clamping element 72 can then also be performed by means of bringing together the holding device 23 and the counter holding device 24 for the purpose of fixing the insulating paper 50.

After forming a sufficiently narrow winding gap 66, it is possible to wind a coil wire by way of wire guiding wheels 62 of the flyer winding arm 64 into the winding gap 66 that is defined by means of the pole tip groove 20 of the laminated core 12 and also in the gap between the winding support surface 26 and the inner surface region of the laminated core 12, said inner surface region protruding out of the pole tip groove 20. In the case of a gradual thickening of the magnet coil, the gap between the holding device 23 and the counter holding device 24 can be increased and, as a consequence, it is possible to improve the extent to which the wire arrangement within the coil cross section is filled. The coil wire is inserted from a coil wire reservoir by way of wire guiding wheels 62, wherein the wire tension and the angle of insertion in the winding gap 66 can be varied.

Figure 4:
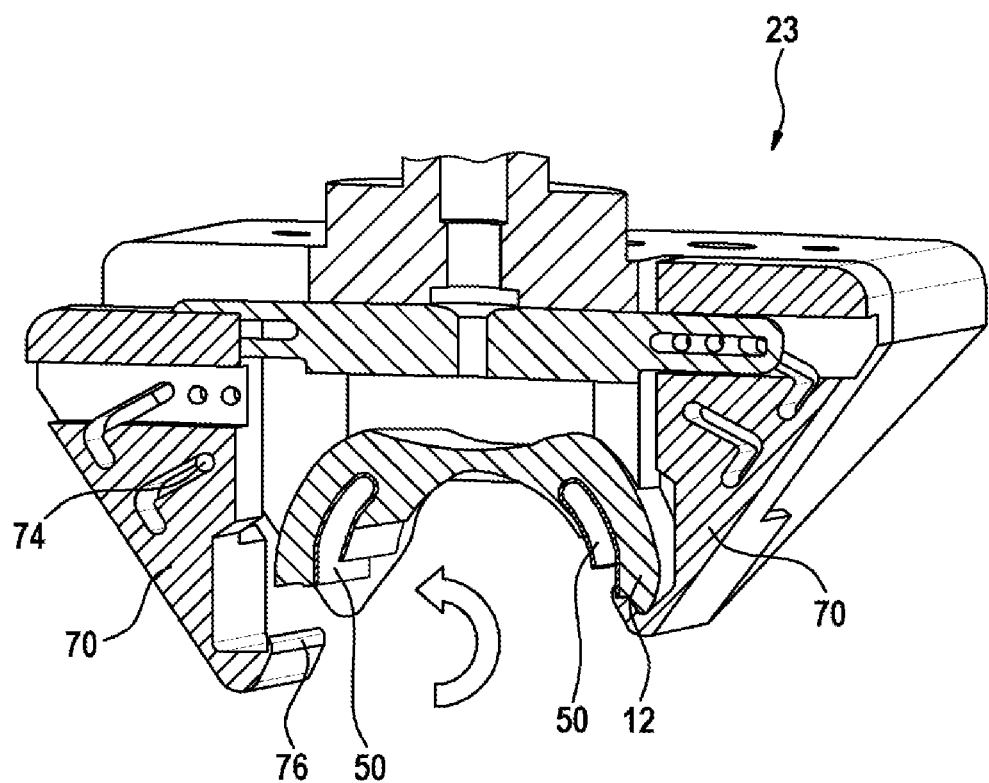

FIG. 4 illustrates a perspective view of a holding device 23 with an inserted laminated core 12 in accordance with an exemplary embodiment of the disclosure. The laminated core 12 that has already been provided with insulating paper 50 is already inserted into the holding device 23. Afterwards, the first clamping elements 70 that are embodied as clamping claws in the illustrated example are closed by way of at least one guiding element 74 that is embodied in the illustrated example as a guiding groove and in fact in such a manner that the clamping elements 70 are brought together by way of said guiding groove in a movement that is illustrated in the drawing as an arrow so that the clamping jaws 78 of the clamping element 70 meet perpendicular to the surface of the insulating paper in the end phase of the movement. On the left-hand side of the holding device 23, the clamping element 70 is illustrated in the opened state, and on the right-hand side the holding device is illustrated in the closed state.

Figure 5:
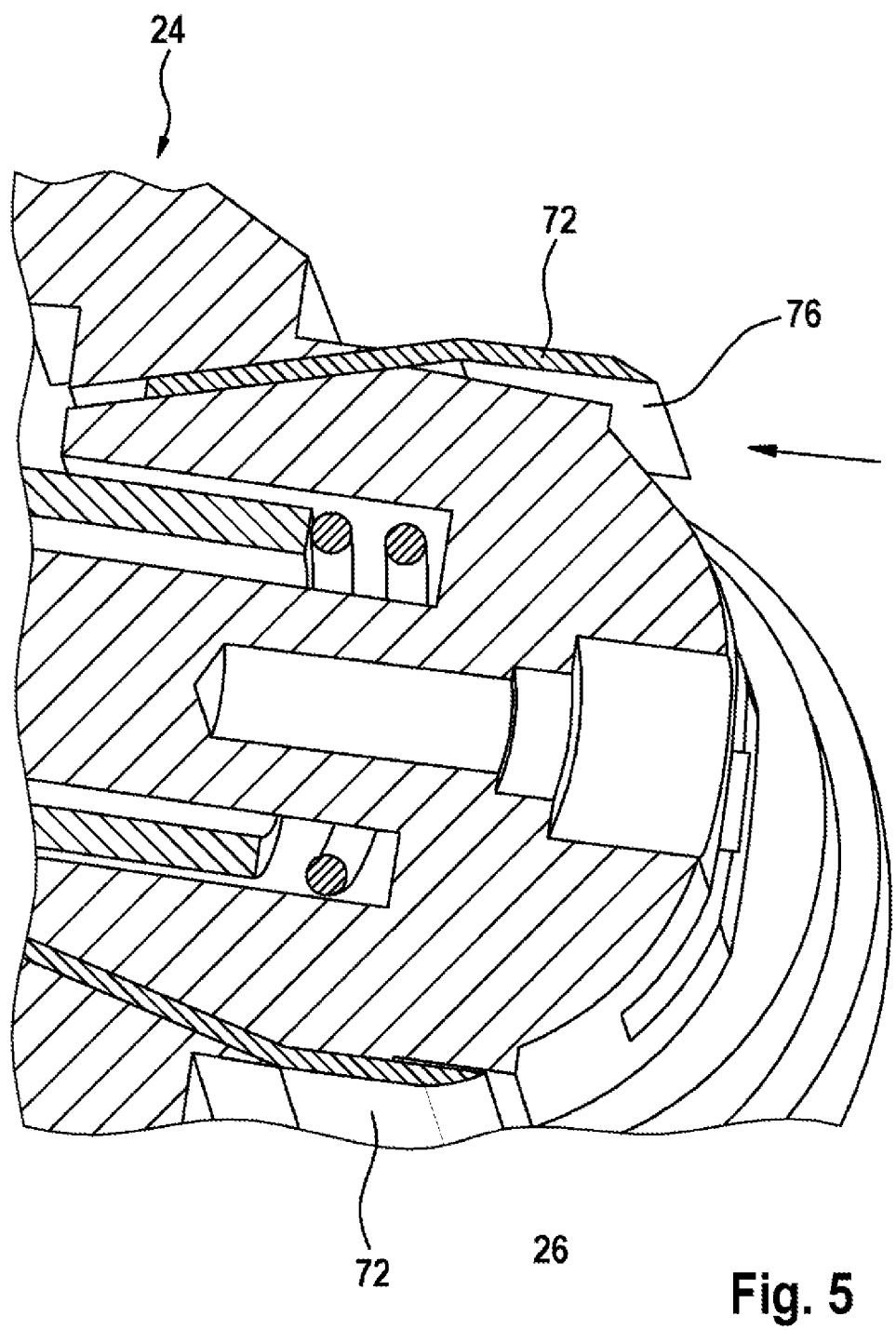

FIG. 5 illustrates a perspective view of a counter holding device 24 with an opened second clamping element 72 in accordance with an exemplary embodiment of the disclosure. FIG. 5 illustrates a winding support surface 26 of the counter holding device 24 as a sectional view with in this example two second clamping elements 72 that are embodied in this case as slider clamps. In the upper part of FIG. 5, the clamping element 72 is illustrated in an open state so that a gap 76 appears between the winding support surface 26 and the clamping element 72 and the insulating paper 50 that is inserted in the laminated core 12 can be pushed into said gap whilst bringing the holding device 23 and the counter holding device 24 together. The direction of insertion of the insulating paper 50 is illustrated in the drawing with the arrow. The clamping element 72 is illustrated in its closed state in the lower part of FIG. 5 and in this state the gap 76 is closed and therefore the insulating paper 50 is securely clamped. The closed state is evident in the following FIG. 6 with the insulating paper that is clamped in.

Figure 6:
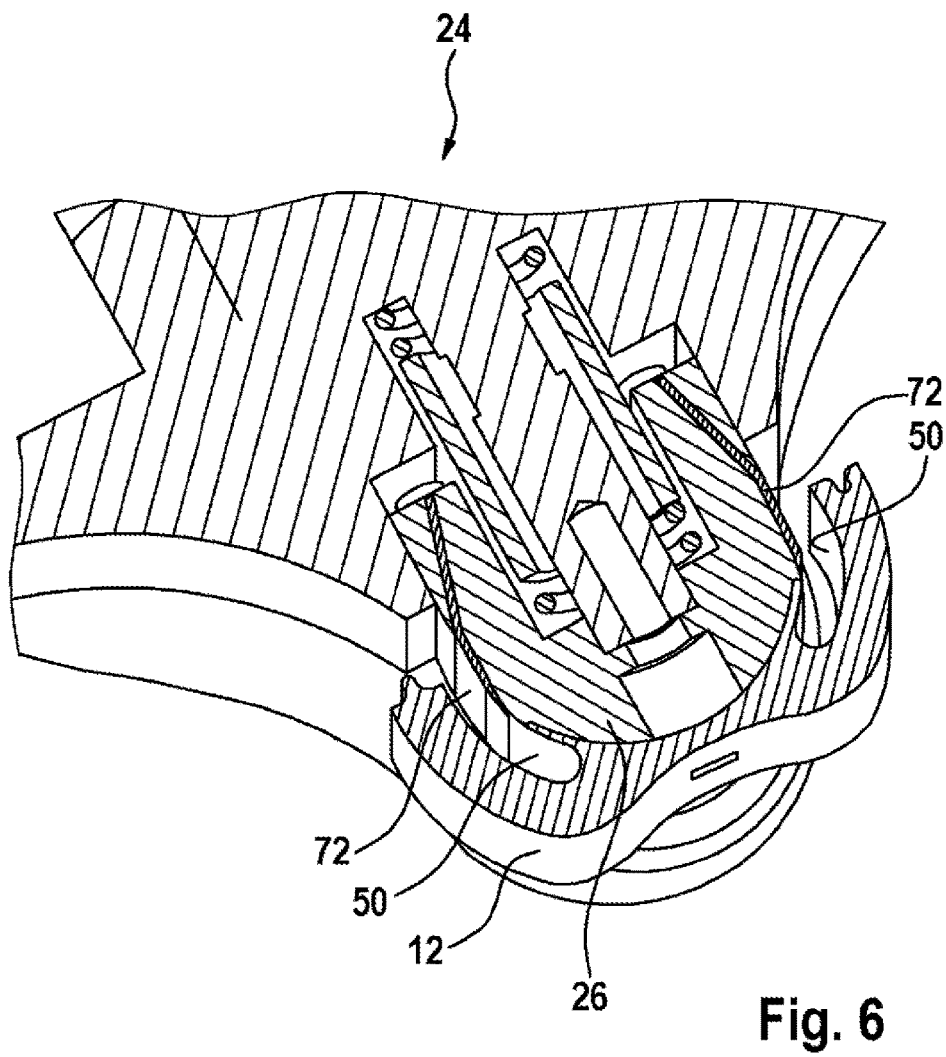

FIG. 6 illustrates a perspective view of a counter holding device 24 with an inserted laminated core 12 in accordance with an exemplary embodiment of the disclosure. The laminated core 12 is already provided with insulating paper 50. In the drawing, the counter holding device 24 is illustrated with the closed second clamping elements 72 that in this illustrated example are embodied as slider clamps. In this state, the clamping elements are pulled back and, as a consequence, have closed the gap 76 between the winding support surface 26 and the one or multiple second clamping elements 72 by means of pulling back the one or multiple second clamping element 72 in the direction that is remote from the laminated core 12 so that the insulating paper 50 is securely fixed between the clamping element 72 and the winding support surface 26. The holding device 23 that actually only brings the laminated core 12 into contact with the counter holding device 24 during the process of bringing the two devices together is omitted in the drawing for the purpose of improving the visibility of the laminated core.

A clear improvement of the magnet coil construction for electric motors and also a clear improvement in the manner in which the coil wires are compacted can be achieved by means of the new winding apparatus and the new winding method. As a result of a process of "pre-baking" the coil wire, it is possible to perform the fixing process even during and/or after the process of winding the magnet coil. The form and geometry of the pole tips and of the pole tip groove progression can be adjusted for an optimal compaction of the coil wires and a controlled cross sectional design of the magnet coil. A process of baking the displaced wires can be performed during the winding process. As a consequence, it is possible in the case of identical construction sizes to provide stators and/or armatures that are more efficient and therefore motors that are more efficient and less susceptible to malfunction and have a longer serviceable life, in particular for operation in an electric tool machine.

The invention claimed is:

1. A method for winding a laminated core with a magnet coil with an apparatus including: (i) a holding device; (ii) a counter holding device; and (iii) one or multiple clamping elements, the method comprising:
    inserting a laminated core having an insulating paper into the apparatus by inserting an outer surface of the laminated core into the holding device;
    moving a winding support surface of the counter holding device toward an inner surface of the inserted laminated core along an axis;
    winding a conductive, insulated coil wire about the axis into one or multiple pole tip grooves of a winding surface of the laminated core after moving the counter holding device toward the inner surface; and
    fixing the insulating paper to a pole tip groove of the laminated core with the one or multiple clamping elements by fixing the insulating paper into at least one of (i) the holding device with a first clamping element of the one or multiple clamping elements; and (ii) the counter holding device with a second clamping element of the one or multiple clamping elements.

2. The method as claimed in claim 1, wherein the first clamping element of the one or multiple clamping elements is configured to fix the insulating paper to the holding device.

3. The method as claimed in claim 2, wherein the first clamping element is provided on a face of one of the one or multiple pole tip grooves that is remote from a pole tip of the laminated core.

4. The method as claimed in claim 3, wherein a second clamping element of the one or multiple clamping elements is provided on the counter holding device and configured to fix the insulating paper.

5. The method as claimed in claim 4, wherein the second clamping element is provided on a face of one of the one or multiple pole tip grooves that is facing the pole tip of the laminated core.

6. The method as claimed in claim 5, wherein:
    the counter holding device includes at least one winding support surface having at least one coil-shaping element and configured to be displaced or pivoted relative to a region of the winding surface of the laminated core;
    the region of the at least one winding support surface protrudes out of the pole tip groove;
    a winding position of the coil wire or a part region of the magnet coil protruding out of the pole tip groove is predefined during the winding step; and
    the coil-shaping element defines a groove configured to guide the second clamping element to fix the insulating paper between the at least one winding support surface and the second clamping element on the face of the one or multiple pole tip grooves facing the pole tip such that the insulating paper is received.

7. The method as claimed in claim 6, wherein the apparatus further comprises:
    a guiding element provided on the holding device,
    wherein the first clamping element is configured to be moved perpendicular to a surface of the insulating paper via the guiding element when the first clamping element is closed such that the insulating paper is fixed to the face of the pole tip groove facing the pole tip.

8. The method as claimed in claim 7, wherein the insulating paper is fixed to the face of the pole tip groove facing the pole tip by closing a gap between the winding support surface and the second clamping element by pulling back the second clamping element in a direction that is remote from the laminated core.

9. The method as claimed in claim 8, further comprising pulling back the second clamping element so as to fix the insulating paper by bringing together the holding device and the counter holding device.

10. The method as claimed in claim 1, wherein the apparatus comprises a heating device for baking at least one of the magnet coil and the laminated core.

11. The method as claimed in claim 1, further comprising baking or partially baking at least one of the magnet coil and the laminated core after winding the conductive, insulated coil wire into the one or multiple pole tip grooves of the winding surface of the laminated core.

12. The method as claimed in claim 11, further comprising powder coating at least one of the magnet coil and the laminated core after the baking or partially baking.

13. The method of claim 1, wherein fixing the insulating paper to a pole tip groove comprises:
    pushing a first end of the insulating paper toward a first of the one or multiple pole tip grooves with the first clamping element of the one or multiple clamping elements.

14. The method of claim 13, wherein the counter holding device comprises a third clamping element of the one or multiple clamping elements, the method further comprising:
    clamping a second end of the insulating paper with the third clamping element.

15. The method of claim 14, wherein pushing a first end of the insulating paper comprises:
    closing the first clamping element using a guiding groove in the first clamping element.

16. The method of claim 15, wherein closing the first clamping element comprises:
    moving the first clamping element in a first direction toward the first of the one or multiple pole tip grooves; and
    moving in a second direction after moving in the first direction, the second direction generally orthogonal to the first direction.

17. A method for winding a laminated core with a magnet coil with an apparatus including: (i) a holding device; (ii) a counter holding device; and (iii) one or multiple clamping elements, the method comprising:
    inserting a laminated core having an insulating paper into the apparatus by inserting an outer surface of the laminated core into the holding device;
    moving a winding support surface of the counter holding device toward an inner surface of the inserted laminated core along an axis;
    winding a conductive, insulated coil wire about the axis into one or multiple pole tip grooves of a winding surface of the laminated core after moving the counter holding device toward the inner surface; and fixing the insulating paper to a pole tip groove of the laminated core with the one or multiple clamping elements by pushing a first end of the insulating paper toward a first of the one or multiple pole tip grooves with a first clamping element of the one or multiple clamping elements.

18. The method of claim 17, wherein the counter holding device comprises a second clamping element of the one or multiple clamping elements, the method further comprising:

clamping a second end of the insulating paper with the second clamping element.

19. The method of claim 18, wherein pushing a first end of the insulating paper comprises:

closing the first clamping element using a guiding groove in the first clamping element.

20. The method of claim 19, wherein closing the first clamping element comprises:

moving the first clamping element in a first direction toward the first of the one or multiple pole tip grooves; and moving in a second direction after moving in the first direction, the second direction generally orthogonal to the first direction.

* * * * *